(12) United States Patent
Buhlmann et al.

(10) Patent No.: US 12,398,569 B2
(45) Date of Patent: Aug. 26, 2025

(54) PANEL HAVING SEALED PANEL EDGE AND METHOD FOR PRODUCING SAID PANEL

(71) Applicant: SURFACE TECHNOLOGIES GMBH & CO. KG, Baruth (DE)

(72) Inventors: Carsten Buhlmann, Rangsdorf (DE); Eberhard Herrmann, Wismar (DE)

(73) Assignee: SURFACE TECHNOLOGIES GMBH & CO. KG, Baruth (DE)

( * ) Notice: Subject to any disclaimer, the term of this patent is extended or adjusted under 35 U.S.C. 154(b) by 310 days.

(21) Appl. No.: 17/912,600

(22) PCT Filed: Feb. 17, 2021

(86) PCT No.: PCT/EP2021/053831
§ 371 (c)(1),
(2) Date: Sep. 19, 2022

(87) PCT Pub. No.: WO2021/190822
PCT Pub. Date: Sep. 30, 2021

(65) Prior Publication Data
US 2023/0175271 A1 Jun. 8, 2023

(30) Foreign Application Priority Data
Mar. 24, 2020 (EP) ..................... 20165196

(51) Int. Cl.
*E04F 15/00* (2006.01)
*B32B 3/02* (2006.01)
(Continued)

(52) U.S. Cl.
CPC .......... *E04F 15/02033* (2013.01); *B32B 3/02* (2013.01); *C09D 7/41* (2018.01);
(Continued)

(58) Field of Classification Search
CPC ... E04F 15/00; E04F 15/02033; E04F 15/107; B32B 3/02; B32B 29/002;
(Continued)

(56) References Cited

U.S. PATENT DOCUMENTS 11,752,737 B2 * 9/2023 Luttwak ................. G10D 13/01
428/116
12,083,781 B2 * 9/2024 Catherineau ............ B32B 21/14
(Continued)

FOREIGN PATENT DOCUMENTS

CN 101148573 A 3/2008
EP 2345545 A1 7/2011
(Continued)

OTHER PUBLICATIONS

Korean Office Action regarding Application No. 10-2022-7030346, mailed Oct. 31, 2023.
(Continued)

*Primary Examiner* — Chi Q Nguyen
(74) *Attorney, Agent, or Firm* — Harness, Dickey & Pierce, P.L.C.

(57) ABSTRACT

A method for producing a panel having a sealed panel edge comprises the steps of: providing a raw panel comprising a panel upper face, a panel lower face and at least one pair of panel edges lying opposite each other, the raw panel having a carrier plate core and a print substrate layer, which is applied to the panel upper face; forming a chamfer between at least one panel edge of the pair of panel edges lying opposite each other and the panel upper face; sealing the at least one panel edge with an impregnating agent, the impregnating agent being applied to the at least one panel edge and to the chamfer. A raw panel produced by the method and an assembly of the panel with a baseboard are discussed.

15 Claims, 2 Drawing Sheets

Figure 1A:
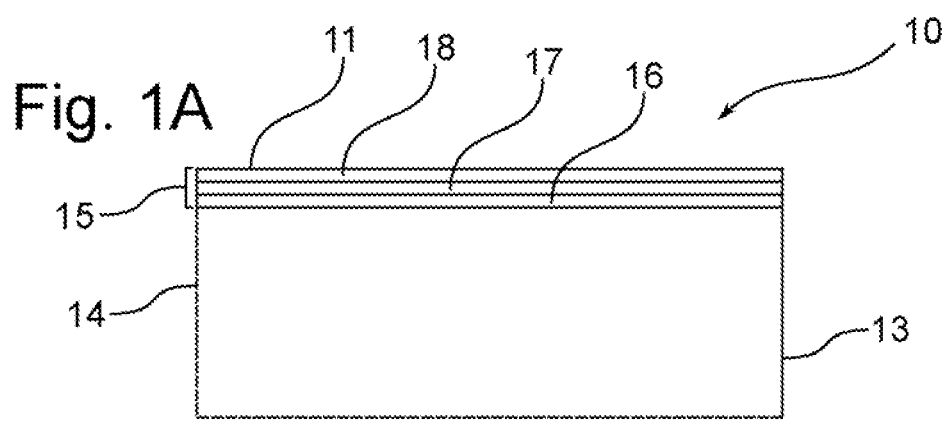

(51) Int. Cl.
*C09D 7/41* (2018.01)
*C09D 133/14* (2006.01)
*E04F 15/02* (2006.01)
*E04F 15/10* (2006.01)
*B32B 29/00* (2006.01)

(52) U.S. Cl.
CPC .......... *C09D 133/14* (2013.01); *E04F 15/107* (2013.01); *B32B 29/002* (2013.01); *B32B 2255/26* (2013.01); *B32B 2260/028* (2013.01); *B32B 2260/046* (2013.01); *B32B 2451/00* (2013.01)

(58) Field of Classification Search
CPC .......... B32B 2255/26; B32B 2255/289; B32B 2260/028; B32B 2260/04; B32B 2260/00; B32B 2260/046; B32B 2451/00; C09D 7/41; C09D 133/14
See application file for complete search history.

(56) References Cited

U.S. PATENT DOCUMENTS

| | | | | |
|---|---|---|---|---|
| 12,110,693 | B1* | 10/2024 | Devos | E04F 15/02038 |
| 12,129,661 | B2* | 10/2024 | Naeyaert | E04F 15/02038 |
| 2009/0260313 | A1 | 10/2009 | Segaert | |
| 2010/0227132 | A1* | 9/2010 | Pierson | B32B 5/26 |
| | | | | 428/423.1 |
| 2011/0171412 | A1 | 7/2011 | Dohring | |
| 2016/0369507 | A1* | 12/2016 | Pervan | B32B 38/08 |
| 2018/0155934 | A1 | 6/2018 | D'Hondt et al. | |
| 2022/0183171 | A1* | 6/2022 | Basquin | B32B 3/263 |
| 2022/0213693 | A1* | 7/2022 | Courey | B32B 27/32 |
| 2022/0243465 | A1* | 8/2022 | Kreysler | E04F 13/0898 |

FOREIGN PATENT DOCUMENTS

| | | |
|---|---|---|
| KR | 1020150100718 A | 9/2015 |
| UA | 105635 C2 | 6/2014 |
| WO | 2007113676 A2 | 10/2007 |
| WO | 2016182896 A1 | 11/2016 |

OTHER PUBLICATIONS

First Chinese Office Action regarding Patent Application No. 2021800190112, dated Nov. 15, 2023.

Ukrainian Office Action regarding Application No. a 2022 03890, dated Apr. 18, 2025.

* cited by examiner

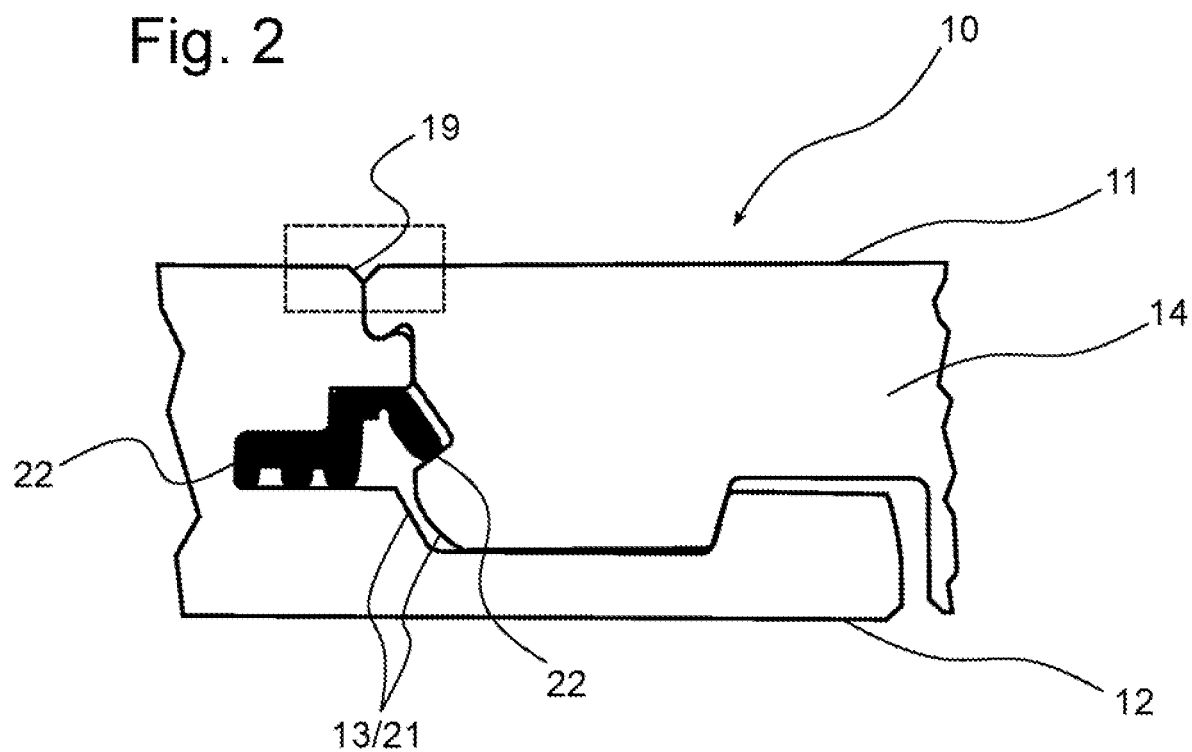

PANEL HAVING SEALED PANEL EDGE AND METHOD FOR PRODUCING SAID PANEL

CROSS-REFERENCE TO RELATED APPLICATIONS

This application is a National Phase of International Application No. PCT/EP2021/053831, filed on Feb. 17, 2021, which claims the benefit of European Patent Application No. 20165196.5, filed on Mar. 24, 2020. The entire disclosures of the above applications are incorporated herein by reference.

FIELD

The present disclosure relates to a method for producing a panel having a sealed panel edge, a raw panel having a sealed panel edge and an assembly of a panel comprising such a raw panel with a baseboard.

BACKGROUND

This section provides background information related to the present disclosure which is not necessarily prior art.

Panels with retaining profiles are known per se and can be used in particular as decorated wall or floor panels, wherein the term wall panel also refers to panels suitable for ceiling or door cladding. They usually consist of a carrier or core made of a solid material, for example a wood material, plastic or composite material, which is covered on at least one side with a decorative layer and a top layer and optionally with further layers, for example a wear layer arranged between the decorative layer and the top layer. The decorative layer is, for example, a printed paper impregnated with a resin. The top layer and the other layers also usually made of resin, too.

Such known panels comprise retaining profiles at the panel edges in a manner known per se. The retaining profiles hold the panels together in the installed state by means of a form-fit connection. In this respect, various retaining profiles are known. Simple tongue-and-groove joints comprise a simple groove and a complementary tongue, which act perpendicularly to the panel plane. More complex retaining profiles are known in particular for panels for glueless installation. In this case, the complementary retaining profiles of two panels to be connected are designed in such a way that the form-fit connection by hooks and undercuts also prevents the panels from being pulled apart. Thus, the panels can be laid floating, i.e. they do not have to be glued to the floor, and they also need not be glued together. This makes the installation of such panels particularly simple and fast, and due to the flexibility of the connections the bottom can also adapt to a certain extent to unevennesses of the floor and can also react to temperature fluctuations. In addition, with glueless installation, panels can be easily replaced if they are damaged.

However, one problem with panels installed in this manner is that the joints are susceptible to liquid ingress. Here the panel edges are exposed to moisture without protection. While the surface of panels is usually designed to withstand heavy use and is also protected against moisture accordingly, the various layers of the panel are exposed at the panel edges. However, these are not all impervious to moisture. The various layers of the panel can therefore potentially absorb moisture when moisture penetrates into the joints and, for example, swell up unintentionally.

Thus, there is a need to seal the panel edges of panels.

Known panels may have circumferential chamfers. Chamfers make the panels more resistant to wearout due to impacts at the edges and give them a more attractive appearance. However, a disadvantage of such chamfers is that when panels are joined together, V-joints are formed in which water can be collected, for example, when the floor is mopped. Thus, the otherwise advantageous panels comprising chamfers are particularly susceptible to the ingress of liquids into the joints and the panel edges.

The moisture protection of panels thus still offers potential for improvement.

SUMMARY

This section provides a general summary of the disclosure, and is not a comprehensive disclosure of its full scope or all of its features.

It is therefore the object of the present disclosure to provide panels with improved moisture protection.

The disclosure proposes a method for producing a panel having a sealed panel edge, comprising at least the steps of:
a) providing a raw panel comprising a panel upper face, a panel lower face and at least a pair of opposing panel edges, wherein said raw panel comprises a carrier plate core and a print substrate layer applied to the panel upper face,
b) forming a chamfer between at least one panel edge of the pair of opposing panel edges and the panel upper face,
c) sealing the at least one panel edge, wherein the sealing comprises impregnating with an impregnating agent, wherein the impregnating agent is applied onto the at least one panel edge and onto the chamfer.

Surprisingly, it has been shown that panels made of such raw panels offer particularly good moisture protection. In particular, by combining the chamfer with the impregnation of the chamfer and the panel edge, it can be achieved that the impregnation of the panel edge can overlap with a subsequent surface finish, such as a decorative layer or a wear layer. Thus it can be achieved that no moisture penetrates between moisture-protecting layers into the panel edge. By forming a chamfer and impregnating the chamfer, it can moreover be achieved that moisture is already not absorbed by the chamfer and thus collects in a formed joint instead of being drawn into the joint as by a capillary.

In the sense of the disclosure, the term "panel" means in particular wall, ceiling, door or floor panels. These can comprise a decoration simulating a decorative template applied to a carrier plate core. Decorative panels are used in a variety of ways, both in the field of interior design of rooms and for the decorative cladding of buildings, for example in exhibition stand construction. One of the most common fields of application of decorative panels is their use as floor covering. In many cases, the decorative panels comprise a decoration that is intended to imitate a natural material.

In the sense of the disclosure, the term "panel edge" means the surface that connects the panel upper face to the panel lower face.

The term "carrier panel core" is to be understood in the sense of the disclosure to mean that the core of the raw panel consists essentially of a carrier plate. Depending on the desired field of application of the panels, carrier plates can be made of different materials. In particular, the material of the carrier plate can be selected depending on the field of application. For example, the carrier plate may be made of a wood-based material, provided that the panel is not exposed to excessive moisture or weather conditions. If, on the other hand, the panel is to be used, for example, in damp rooms or outdoors, the carrier plate may, for example, be made of a plastic material. Since the present disclosure relates to the sealing of panel edges, the disclosure is particularly advantageous for water-sensitive carrier plates, such as carrier plates made of a wood-based material.

In this context, wood-based materials in the sense of the disclosure are, in addition to solid wood materials, materials such as cross-laminated timber, gluelaminated timber, blockboard, veneered plywood, laminated veneer lumber, parallel strand lumber and bending plywood. In addition, wood-based materials in the sense of the disclosure are also chipboards such as pressboards, extruded boards, oriented structural boards (OSB) and laminated strand lumber as well as wood fiber materials such as wood fiber insulation boards (HFD), medium hard and hard fiberboards (MB, HFH) and in particular medium density fiberboards (MDF) and high density fiberboards (HDF). Even modern wood-based materials such as wood polymer materials (wood plastic composite, WPC), sandwich boards made of a lightweight core material such as foam, rigid foam or honeycomb paper and a layer of wood applied thereto, and minerally hardened, for example with cement, chipboards are wood-based materials in the sense of the disclosure. Moreover, cork represents a wood-based material in the sense of the disclosure.

In the sense of the disclosure, a "print substrate layer" means a layer which is suitable for printing.

In the sense of the present disclosure, a "chamfer" is to be understood as the surface which is formed when an edge of two adjacent surfaces is chamfered and which connects the two surfaces to each other.

Thus, a method described above is particularly useful for producing raw panels having a sealed panel edge. Such raw panels can be further processed by known methods into corresponding panels, in particular into decorative panels.

Preferably, it may be provided that providing a raw panel comprises the method steps:
  d) providing a carrier plate,
  e) applying a print substrate layer onto an upper face of the carrier plate to form a layer stack,
  f) compressing the layer stack obtained in step e) to form a multilayer panel, while forming a non-destructively detachable bond between the carrier plate and the print substrate layer,
  g) dividing the multilayer panel obtained in step f) into raw panels comprising the panel upper face, the panel lower face and the at least one pair of opposing panel edges.

Thus, advantageously, a raw panel can be provided, the panel edge of which can be sealed particularly well by the method described above. In particular, it can be advantageously provided that the method steps d) to g) are carried out together with method steps a) to c) in a continuous process. Thus, the panel edges can be sealed directly after production. Thus, it can be achieved that the raw panels can already be readily stored as semi-finished products. It can thus be achieved in particular that the storage of the raw panels obtained does not involve particularly high humidity requirements.

In the sense of the disclosure, a carrier plate can be understood in particular to mean a large plate or a web-shaped carrier. In this context, a "web-shaped carrier" can be understood to mean a carrier which, for example in its manufacturing process, has a web-like shape and thus has a significantly greater length compared to its thickness or width, and the length of which can be greater than 15 meters, for example. In the sense of the present disclosure, a "large plate" can also be understood as a carrier whose dimensions several times exceed the dimensions of the final decorative panels, and which in the course of the manufacturing process is separated in a corresponding plurality of decorative panels, for example by sawing, laser or water jet cutting. For example, the large plate can correspond to the web-shaped carrier.

The compressing can advantageously be a compressing by use of a short-cycle press, a belt press or a calendar.

In the sense of the disclosure, the separating of the multilayer plate can be understood in particular as a separation of the multilayer plate into a plurality of panels. Separation in this context means in particular cutting along a longitudinal direction of the multilayer plate. For example, in a continuous process, in particular in an endless process, this can be understood to mean cutting along a conveying direction of the carrier.

Preferably, it can be provided that the application of the print substrate layer comprises at least applying a first melamine resin layer onto the carrier plate and applying a fiber layer onto the first melamine resin layer, and optionally applying a second melamine resin layer onto the fiber layer.

In this way, it can advantageously be achieved that the print substrate layer can be particularly well bonded to the carrier and that a printed decoration adheres particularly well to the print substrate layer.

In the sense of the disclosure, the term "melamine resin layer" is to be understood as a layer comprising a melamine resin, preferably consisting essentially of a melamine resin. Melamine resin in this context means the condensation product of melamine and formaldehyde. This also includes modified melamine resins. For example, the melamine resin layer may comprise urea-modified melamine resin, i.e. the condensation product of melamine, urea and formaldehyde.

A fiber layer means a layer of a fiber material. In the sense of the present disclosure the term fiber materials means materials such as paper and nonwoven fabrics on the basis of plant, animal, mineral or even synthetic fibers as well as cardboards. Examples of fiber materials made of plant fibers in addition to papers and nonwoven fabrics made of cellulose fibers are boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool. Particularly preferably, the fiber layer may be a paper layer.

Preferably, it can be provided that after the sealing the method comprises a surface finishing, comprising the method steps:
  h) printing a decoration onto the panel upper face,
  i) applying a lacquer-containing top layer onto the panel upper face, and
  j) optionally structuring the lacquer-containing top layer, wherein the surface finishing optionally also includes the chamfer.

Advantageously, this allows the raw panel to be processed into a panel. In particular, it can advantageously be achieved in this way that the surface is adapted according to the desired application of the panel. Advantageously, the lacquer-containing top layer can at least adjoin the sealed panel edge and thus also reduce moisture ingress from above behind the seal.

Preferably, the printing of the panel upper face may be direct printing.

In the sense of the disclosure, the term "direct printing" is understood to mean applying a decoration directly onto the panel surface. In contrast to conventional methods, in which a decorative layer previously printed with a desired decoration is applied onto a carrier, in direct printing the decoration is printed directly in the course of surface coating or panel manufacture. Here, different printing techniques, such as flexographic printing, offset printing or screen printing, can be used. Here, in particular, digital printing processes such as inkjet processes or laser printing processes can be used. The term "digital printing process" is to be understood in the sense of the disclosure as a computer-controlled direct printing process.

Alternatively, it is not excluded in the sense of the present disclosure that the decoration is applied in such a way that, for example, an already printed fiber layer, such as a paper layer, or also an already printed film, such as of polyethylene, polypropylene or polyvinyl chloride, is applied onto the substrate.

In the sense of the disclosure, a top layer is to be understood as a layer which essentially serves to protect the surface. For example, the top layer may also be an anti-wear layer.

In one embodiment, it may be provided that, prior to printing the panel upper face with a decoration, a resin composition, preferably a melamine resin, comprising solids and/or pigment is applied onto the print substrate layer. Preferably, the resin layer comprises solids and/or pigments with a grain diameter $d_{50}$ between ≥0.1 μm and ≤120 μm, preferably between ≥1 μm and ≤100 μm, in a range from ≥5 wt.-% to ≤85 wt.-%, preferably from ≥10 wt.-% to ≤80 wt.-%, more preferably between ≥35 wt.-% and ≤75 wt.-%. The solids may preferably be selected from the group consisting of titanium dioxide, barium sulfate, barium oxide, barium chromate, zirconium(IV)oxide, silicon dioxide, aluminum hydroxide, aluminum oxide, iron oxide, iron(III) hexacyanoferrate, chromium oxide, cadmium oxide, cadmium sulfide, cadmium selenite, cobalt oxide, cobalt phosphate, cobalt aluminate, vanadium oxide, bismuth vanadium oxide, tin oxide, copper oxide, copper sulfate, copper carbonate, lead antimonate, lead chromate, lead oxide, lead carbonate, calcium carbonate, calcium sulfate, calcium aluminate sulfate, zinc oxide, zinc sulfide, arsenic sulfide, mercury sulfide, carbon black, graphite, or mixtures thereof. The pigments may preferably be selected from the group consisting of Berliner blue, brilliant yellow, cadmium yellow, cadmium red, chromium oxide green, cobalt blue, cobalt coelin blue, cobalt violet, irgazin red, iron oxide black, manganese violet, phthalocyanine blue, Terra di Siena, titanium white, ultramarine blue, ultramarine red, umber, kaolin, zirconium silicate pigments, monoazo yellow and monoazo orange, thioindigo, beta-naphthol pigments, naphthol AS pigments, pyrazolone pigments, N-acetoacetic anilide pigments, azometal complex pigments, diaryl yellow pigments, quinacridone pigments, diketopyrrolopyrrole pigments (DPP), dioxazine pigments, perylene pigments, isoindolinone pigments, copper phthalocyanine pigments and mixtures thereof.

By using such solids, in particular, a colored print substrate can be provided whose coloring has a property that supports decorative printing. For example, in the case of a decorative design intended to represent a dark wood species, a print substrate with a brown or brownish basic color can be applied, while in the case of a decorative design intended to represent a light wood species or a light-colored stone, a print substrate with a yellow or white basic color can be applied.

In the sense of the disclosure, the term "lacquer-containing top layer" is to be understood as a layer comprising a topcoat, preferably consisting essentially of a topcoat.

The application of the lacquer-containing top layer can also comprise the application of several top layers.

Preferably, it can be provided that the lacquer-containing top layer is cured after application, preferably radiation cured, particularly preferably radiation cured with UV radiation with a wavelength in a range from 10 nm to 450 nm. The curing may be a complete curing or a partial curing. Preferably, it can be provided that the lacquer-containing top layer comprises an acrylate-based lacquer, in particular a polyurethane-modified acrylate-based lacquer. In this way, it can be achieved that the lacquer-containing top layer can be easily cured and well structured.

Preferably, it may be provided that the lacquer-containing top layer comprises hard materials, preferably in an amount between 5 wt.-% and 40 wt.-%, wherein the hard materials preferably have a grain diameter $d_{50}$ between 10 μm and 250 μm.

Generally known methods, such as laser diffraction, can be used to determine the grain diameter. This allows to determine grain diameters in the range from a few nanometers up to several millimeters. This method can also be used to determine $d_{50}$ and $d_{98}$ values, respectively, which indicate that 50% ($d_{50}$) and 98% ($d_{98}$) of the grains measured are smaller than the specified value. These values, too, can preferably be determined by means of laser diffraction. In the case of a deviation of the measured values obtained by means of different measuring methods, the value determined by means of laser diffractometry is considered by the applicant to be decisive.

In the sense of the disclosure, the term "hard materials" is understood to mean materials which have a sufficient hardness. For example, the hard materials may have a Mohs hardness of at least ≥8, preferably at least ≥9. Examples of suitable hard materials are titanium nitride, titanium carbide, silicon nitride, silicon carbide, boron carbide, tungsten carbide, tantalum carbide, aluminum oxide (corundum), zirconium oxide, zirconium nitride or mixtures thereof.

Advantageously, this enables the lacquer-containing top layer to be particularly abrasion-resistant. Hard materials in the lacquer-containing top layer provide abrasion protection over the entire surface of the lacquer-containing top layer.

Preferably, it can be provided that the lacquer-containing top layer is structured. In the sense of the disclosure, structuring means producing a haptically perceptible structure.

It may be provided that the structuring follows a simple pattern. Alternatively, it may be provided that the structure is formed at least partially synchronously with the decoration. Thus, preferably, it may be provided that the structuring of the surface comprises forming a structure that is at least partially synchronous with the decoration.

Synchronous structuring is understood to mean that the structure is adapted in its shape and pattern to the applied decoration in order to achieve a reproduction as faithful as possible to the original, for example of a natural material, even with regard to the haptic. Preferably, it can be provided that the structure is identical to the three-dimensional structure of a template.

When structuring the lacquer-containing top layer, the structure can be introduced directly into the applied lacquer layer by embossing tools. Preferably, the structure can also be produced by a digital printing process.

Particularly preferably, it may be provided that the surface finishing also encompasses the chamfer.

The fact that the surface finishing also encompasses the chamfer is understood to mean that the method steps described above are also applied to the chamfer in addition to the panel upper face. Thus, the chamfer can be printed with a decoration and provided with a lacquer-containing top layer, which can optionally be structured.

This makes it possible to achieve a particularly preferred seal between the print substrate layer and the carrier plate core. The surface finishing can be bonded on the chamfer directly to the impregnated carrier plate core. A layer boundary between the carrier plate core and the printing base layer, which lies open at the chamfer, can thus be covered with the decoration and with the lacquer-containing top layer.

In one embodiment, it may be provided that a backing paper is applied to the rear side of the carrier plate prior to compressing.

In this way it can advantageously be achieved that no stress imbalance is generated between the panel upper face and the panel lower face. Thus, undesired warping of the panel can be prevented.

Preferably, it can be provided that the raw panel comprises two pairs of opposing panel edges. Preferably, it may be provided that a chamfer is formed at each panel edge. It may further preferably be provided that each panel edge is sealed.

In this way, it can be achieved that the panel is sealed circumferentially.

Preferably, it may be provided that the impregnating agent is applied onto the at least one panel edge and onto the chamfer in adjacent areas.

In this way, it can advantageously be achieved that for installed panels the transition between an exposed surface of the chamfer to the non-exposed surfaces of the panel edge is impregnated throughout. Thus, it can advantageously be achieved that the panel is particularly well protected against moisture at this transition.

Preferably, the pair of opposing panel edges can be profiled while forming complementary retaining profiles prior to the sealing.

The term "retaining profile" is understood to mean the geometric design of the panel edge. The term is also understood to include multi-part retaining profiles.

The term "complementary retaining profile" is understood to mean a retaining profile whose geometric design essentially complements that of another retaining profile. In other words, a retaining profile that has a tongue essentially where the other retaining profile has a groove, and vice versa. Two complementary retaining profiles can therefore be fixed to each other in a form-fitting manner. In this case, cavities may remain between the complementary retaining profiles. For example, one retaining profile may comprise a groove and a complementary retaining profile a tongue, or one retaining profile may have a hook and a complementary retaining profile a corresponding undercut, or both retaining profiles may have hooks and undercuts. Interlocking grooves and tongues, which in a fastened state of two complementary retaining profiles abut one another, are to be understood in the sense of the disclosure under the term "locking groove".

In this way, it can advantageously be achieved that the panels can be laid particularly easily. By forming the retaining profiles prior to sealing, it can advantageously be achieved that the retaining profiles are sealed when the panel edge is sealed. By sealing the retaining profiles, it can be achieved that these are protected against moisture, too. Retaining profiles are usually particularly susceptible to moisture, since even slight changes in shape result in that the retaining profiles no longer engage properly with one another.

Preferably, it can be provided that the impregnating agent is applied to the at least one panel edge in an area in which the complementary retaining profile forms a locking groove with the complementary retaining profile of an opposite panel edge, wherein the impregnating agent is preferably also applied in this area onto the other panel edge of the pair of opposing panel edges.

In this way it can advantageously be achieved that the sealing forms a barrier by means of the tightly abutting surfaces of the retaining profiles. Thus, moisture can advantageously not penetrate into the panel edges and is additionally prevented from penetrating through the joint of two panels attached to each other.

Preferably, it can be provided that the impregnating agent is applied onto the chamfer and/or onto the panel edge over the entire surface.

In this way, it can advantageously be achieved that the sealing of the panel edge is particularly effective.

Preferably, it can be provided that the impregnating agent comprises a dipropylene glycol alkyl ether, preferably a dipropylene glycol methyl ether, particularly preferably 2-methoxy-methylethoxy-propanol.

Surprisingly, it has been found that these impregnating agents are particularly suitable for sealing the panel edges. Advantageously, with these impregnating agents it can be achieved that the impregnating agent is at least partially absorbed into the panel edge. This prevents the sealant from being easily removed again. In addition, these impregnating agents are particularly odorless, which is why such panels are particularly suitable for use in living rooms. Furthermore, it has been found that such impregnating agents do not evaporate easily even when exposed to heat, so that the sealant is durable even in sunlight, for example.

Furthermore, it has surprisingly been shown that the impregnating agent described above does not subsequently impair a subsequent surface finish. For example, the impregnating agents do not impair the adhesion of the decoration or the lacquer-containing top layer to the chamfer.

Preferably, it may be provided that the impregnating agent comprises dipropylene glycol alkyl ether in an amount based on the impregnating agent in a range from greater than or equal to 1 wt.-% to less than or equal to 20 wt.-%, preferably greater than or equal to 2.5 wt.-% to less than or equal to 10 wt.-%.

In this way, it can be achieved that the impregnating agent can be applied particularly uniformly.

Preferably, it can be provided that the impregnating agent comprises a solvent, wherein the solvent preferably consists essentially of C11-C13 isoalkanes.

In this way, it can advantageously be achieved that the application of the impregnating agent can be implemented in a particularly simple technical manner. In this way, for example, it can be achieved that the impregnating agent can be sprayed onto the area to be impregnated. In addition, such solvents are advantageously particularly odorless.

Preferably, it can be provided that the impregnating agent comprises a dye.

In this way it can advantageously be achieved that the correct application of the impregnating agent can be easily checked.

Preferably, it may be provided that the sealing of the at least one panel edge comprises coating the chamfer with a sealing lacquer.

In this way, it can advantageously be achieved that an additional sealing of the chamfer is achieved. In particular, it can be achieved in this way that the impregnation of the chamfer is particularly durable. The sealing lacquer can prevent the impregnation from evaporating via the chamfer over time.

Preferably, it can be provided that the sealing lacquer is cured after application, preferably radiation-cured, particularly preferably radiation-cured with UV radiation with a wavelength in a range from ≥10 nm to ≤450 nm.

In this way, it can advantageously be achieved that the sealing lacquer can be applied particularly precisely and that the sealing lacquer is particularly stable.

It may be provided that the curing is carried out in a first curing step with UV radiation having a wavelength in a range from ≥315 nm to ≤450 nm, preferably ≥380 nm to ≤410 nm, and in a second curing step with UV radiation having a wavelength in a range from ≥10 nm to ≤250 nm, preferably from ≥170 nm to ≤225 nm.

Preferably, it can be provided that the sealing lacquer comprises an acrylate-based lacquer, in particular a polyurethane-modified acrylate-based lacquer.

In this way, it can advantageously be achieved that the sealing lacquer can be applied easily and has a good mechanical strength.

Preferably, it can be provided that the sealing lacquer is applied at least partially on to the impregnating agent.

In this way, an overlap between sealing lacquer and impregnating agent can be achieved, whereby the sealing can be particularly dense.

The sealing lacquer can be applied by conventional methods. Preferably, it may be provided that the sealing lacquer is applied by a printing process.

In this way, it can be achieved that the sealing lacquer can be applied particularly precisely.

The disclosure also proposes a raw panel with a sealed panel edge produced according to the method described above. The raw panel includes a panel upper face and a panel lower face and at least one pair of opposing panel edges, wherein the raw panel comprises a carrier plate core and a print substrate layer applied onto the panel upper face, wherein the raw panel comprises a chamfer between at least one panel edge of the pair of opposing panel edges and the panel upper face, and the at least one panel edge comprises a sealing, wherein the at least one panel edge and the chamfer comprise an impregnating agent.

Advantageously, the aforementioned raw panels are particularly well protected against ingress of moisture at the panel edge. Thus, the raw panels can be stored as semifinished products without particularly high requirements. The raw panels can then be further processed into panels in due course.

Preferably, it can be provided that the pair of opposing panel edges comprises complementary retaining profiles.

This allows the raw panels to be easily further processed into panels comprising complementary retaining profiles.

The disclosure also proposes a panel comprising a previously described raw panel comprising a sealed panel edge.

Advantageously, such panels can also be easily wet-cleaned, wherein the risk of swelling of the panels is reduced. Thus, even for applications in which high demands are placed on the resistance of panels to moisture, panels can be used which comprise a swellable carrier material, such as panels comprising a carrier plate core made of a wood-based material. Thus, for example, renewable carrier materials can be used for more humid rooms, resulting in increased environmental friendliness.

The disclosure also proposes an assembly of a panel comprising the aforementioned raw panel comprising a baseboard. The baseboard has a decorative side and at least one baseboard edge adjacent to the decorative side, wherein the baseboard comprises a carrier plate core and a print substrate layer applied onto the decorative side, and wherein the baseboard edge comprises the impregnating agent.

Preferably, the baseboard edge can be sealed in the same manner as the at least one panel edge as described above.

In this way, it can advantageously be achieved that laid panels whose panel edges do not abut the panel edge of an adjacent panel are also well protected against ingress of moisture.

DRAWINGS

The drawings described herein are for illustrative purposes only of selected embodiments and not all possible implementations, and are not intended to limit the scope of the present disclosure.

The disclosure is further explained below with reference to the figures. The figures show possible embodiments of the disclosure. In principle, however, combinations or variations of the embodiments are also possible within the scope of the disclosure.

FIGS. 1A, 1B, 1C and 1D schematically show a detail of the cross-section of a raw panel after various process steps according to one embodiment of the method; and Corresponding reference numerals indicate corresponding parts throughout the several views of the drawings.

DETAILED DESCRIPTION

Example embodiments will now be described more fully with reference to the accompanying drawings.

FIG. 2 schematically shows a cross-section of two interlocked panels with complementary retaining profiles according to one embodiment of the raw panel.

FIG. 1A schematically shows a detail of the cross-section of a raw panel 10 which is provided for implementing the method according to one embodiment. The raw panel 10 has a panel upper face 11 and a panel lower face 12 (not shown) and a pair of opposing panel edges 13 (one not shown). The raw panel 10 comprises a carrier plate core 14 and a print substrate layer 15 applied onto the panel upper face 11. The print substrate layer 15 in the embodiment shown in FIG. 1A comprises three layers obtained by applying a first melamine resin layer 16 onto the carrier plate, applying a paper layer 17 onto the first melamine resin layer 16, and applying a second melamine resin layer 18 onto the paper layer 17.

Figure 1B:
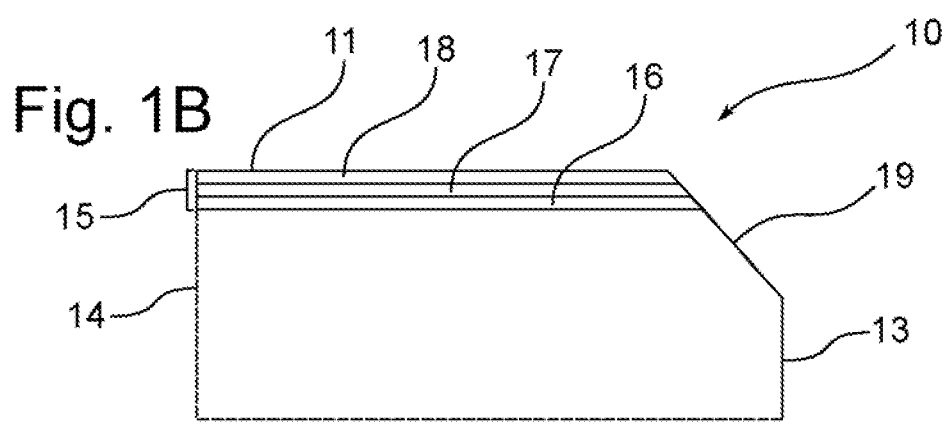

FIG. 1B schematically shows the detail of the cross-section of the raw panel 10 of FIG. 1A, wherein a chamfer 19 has been formed between a panel edge 13 of the pair of opposing panel edges and the panel upper face 11. The chamfer 19 was for example obtained by milling the corner between the panel edge 13 and the panel upper face 11.

Figure 1C:
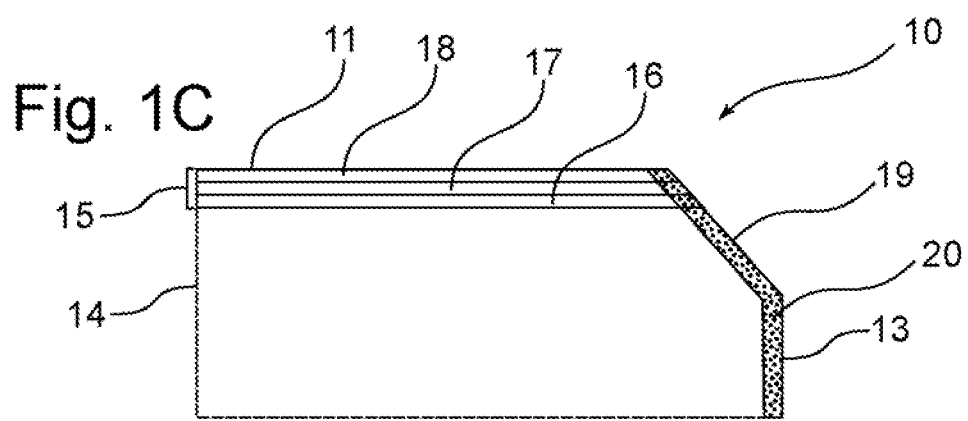

FIG. 1C schematically shows the detail of the cross-section of the raw panel 10 from FIG. 1B, wherein the panel edge 13 has been sealed. An impregnating agent 20 was applied onto the panel edge 13 and the chamfer 19. The impregnating agent 20 was a solution of 7 wt.-% 2-methoxy-methylethoxy-propanol in C11-C13 isoalkanes, which was sprayed onto the chamfer 19 and the panel edge 13. Here, the impregnating agent is absorbed into the raw panel 10 at the points where it was applied.

Figure 1D:
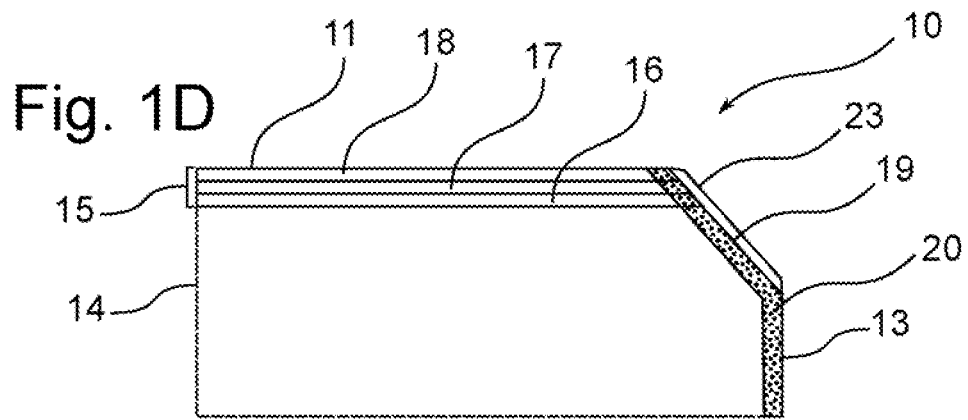

FIG. 1D schematically shows the detail of the cross-section of the raw panel 10 of FIG. 1C, wherein the panel edge 13 was additionally sealed by coating the chamfer 19 with a sealing lacquer 23. The sealing lacquer was a polyurethane-modified acrylate-based lacquer which was at least partially cured at a wavelength in a range of ≥10 nm to ≤450 nm.

As a result, a raw panel 10 with sealed panel edges 13 was obtained.

FIG. 2 schematically shows the cross-section of two interlocked panels 10 comprising complementary retaining profiles 21 according to one embodiment of the raw panel 10. The dashed box exemplarily shows the detail shown in FIGS. 1A to 1D. The panels 10 have a panel upper face 11 and a panel lower face 12 and a pair of opposing panel edges 13 (one shown in each case). The raw panel 10 comprises a carrier plate core 14 and a print substrate layer 15 (not shown) applied onto the panel upper face 11. Prior to sealing, the panels 10 were provided with complementary retaining profiles 21 and a chamfer 19. The complementary retaining profiles 21 form locking grooves 22 together with opposing panel edges 13. During sealing, the impregnating agent is also applied in the area of the locking groove.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for producing a panel comprising a sealed panel edge, the method comprising:
   a) providing a raw panel comprising a panel upper face, a panel lower face and at least one pair of opposing panel edges, wherein the raw panel comprises a carrier plate core and a print substrate layer applied onto the panel upper face;
   b) forming a chamfer between at least one panel edge of the pair of opposing panel edges and the panel upper face, and
   c) sealing said at least one panel edge, wherein said sealing comprises impregnating with an impregnating agent, wherein said impregnating agent is applied onto the at least one panel edge and onto the chamfer, and wherein the impregnating agent comprises a dipropylene glycol alkyl ether.

2. The method according to claim 1, wherein the impregnating agent is applied onto the at least one panel edge and onto the chamfer areas adjacent each other.

3. The method according to claim 1, wherein prior to sealing the pair of opposing panel edges is profiled to form complementary retaining profiles.

4. The method according to claim 3, wherein the impregnating agent is applied onto the at least one panel edge in an area where the complementary retaining profile forms a locking groove together with the complementary retaining profile of an opposing panel edge, wherein the impregnating agent is also applied onto the other panel edge of the pair of opposing panel edges.

5. The method according to claim 1, wherein the impregnating agent is applied onto the chamfer and/or onto the panel edge over an entire area.

6. The method according to claim 1, wherein the impregnating agent comprises a dipropylene glycol methyl ether or 2-methoxy-methylethoxy-propanol.

7. The method according to claim 1, wherein the impregnating agent comprises dipropylene glycol alkyl ether in an amount relative to the impregnating agent in a range from greater than or equal to 1 wt.-% to less than or equal to 20 wt.-%, or greater than or equal to 2.5 wt.-% to less than or equal to 10 wt.-%.

8. The method according to claim 1, wherein the impregnating agent comprises a solvent, wherein the solvent consists essentially of C11-C13 isoalkanes.

9. The method according to claim 1, wherein the impregnating agent comprises a dye.

10. The method according to claim 1, wherein the sealing of the at least one panel edge includes coating the chamfer with a sealing lacquer.

11. The method according to claim 10, wherein the sealing lacquer is cured by radiation after application with UV radiation having a wavelength in a range from ≥10 nm to ≤450 nm.

12. The method to claim 10, wherein the sealing lacquer comprises an acrylate-based lacquer or a polyurethane-modified acrylate-based lacquer.

13. The method according to claim 10, wherein the sealing lacquer is applied at least partially onto the impregnating agent.

14. A raw panel comprising a sealed panel edge produced according to claim 1, comprising a panel upper face and a panel lower face and at least one pair of opposing panel edges, wherein the raw panel comprises a carrier plate core and a print substrate layer applied onto the panel upper face, wherein the raw panel comprises a chamfer between at least one panel edge of the pair of opposing panel edges and the panel upper face, and wherein the at least one panel edge has a sealing, wherein the at least one panel edge and the chamfer comprise an impregnating agent.

15. The raw panel according to claim 14, wherein the pair of opposing panel edges comprise complementary retaining profiles.

* * * * *